(12) United States Patent
Siddam et al.

(10) Patent No.: US 8,675,487 B2
(45) Date of Patent: Mar. 18, 2014

(54) SYSTEM AND METHOD FOR GENERATING AND UPDATING PCC RULES BASED ON SERVICE REQUESTS

(75) Inventors: Kalyan Premchand Siddam, Nepean (CA); Haiqing Ma, Ottawa (CA); Sachin Lalseta, Ottawa (CA); Fernando Cuervo, Dunrobin (CA)

(73) Assignee: Alcatel Lucent, Paris (FR)

( * ) Notice: Subject to any disclaimer, the term of this patent is extended or adjusted under 35 U.S.C. 154(b) by 525 days.

(21) Appl. No.: 12/825,047

(22) Filed: Jun. 28, 2010

(65) Prior Publication Data

US 2011/0317557 A1  Dec. 29, 2011

(51) Int. Cl.
| | |
|---|---|
| H04L 12/26 | (2006.01) |
| H04J 3/24 | (2006.01) |
| H04L 12/54 | (2013.01) |
| G06F 15/16 | (2006.01) |
| G06F 15/173 | (2006.01) |
| G06F 17/00 | (2006.01) |
| H04W 72/00 | (2009.01) |

(52) U.S. Cl.
USPC ...... 370/235; 370/253; 370/349; 370/395.21; 370/401; 709/232; 709/238; 706/48; 455/452.2

(58) Field of Classification Search
USPC ......... 370/468, 232, 328, 223, 235, 253, 349, 370/395.21, 401; 709/223, 227, 232, 238; 706/48; 455/452.2
See application file for complete search history.

(56) References Cited

U.S. PATENT DOCUMENTS

| | | | | |
|---|---|---|---|---|
| 6,854,185 | B1 * | 2/2005 | Alliss | 30/276 |
| 6,865,185 | B1 * | 3/2005 | Patel et al. | 370/412 |
| 7,746,899 | B2 * | 6/2010 | Kim | 370/468 |
| 7,921,367 | B2 * | 4/2011 | Rivas et al. | 715/746 |
| 7,940,659 | B2 * | 5/2011 | Avila Gonzalez et al. | 370/230 |
| 8,018,850 | B2 * | 9/2011 | van Beek et al. | 370/232 |
| 8,111,649 | B1 * | 2/2012 | Agarwall et al. | 370/328 |

(Continued)

FOREIGN PATENT DOCUMENTS

| | | | |
|---|---|---|---|
| WO | WO/2010/022608 | * | 3/2010 |
| WO | WO/2010/031316 | * | 3/2010 |

OTHER PUBLICATIONS

ETSI TS 212, "Universal Mobile Telecommunications System (UMTS); LTE; Policy and Charging Control Over Gx Reference Point (3GPP TS 29.212 version 9.2.0 Release 9)", 2010.

(Continued)

*Primary Examiner* — Alpus H Hsu
*Assistant Examiner* — Anthony Luo
(74) *Attorney, Agent, or Firm* — Kramer & Amado P.C.

(57) ABSTRACT

Various exemplary embodiments relate to method of generating PCC rules for managing packet traffic across a network. The method may include: receiving a request message for PCC rules from a requesting network component, authorizing the first requested bandwidth for a first traffic mapping; authorizing a third bandwidth for at least a second traffic mapping wherein the third authorized bandwidth is less than or equal to a second requested bandwidth minus the first requested bandwidth; generating a first PCC rule comprising: a service flow corresponding to the first traffic mapping and the first authorized bandwidth; and generating a second PCC rule comprising: a service flow corresponding to the second traffic mapping and the third authorized bandwidth. Various exemplary embodiments relate to a Policy and Control Rules Node (PCRN) for generating PCC rules. The PCRN may include an interface, service flow extractor, policy engine, rule generator, rules storage and rules manager.

20 Claims, 6 Drawing Sheets

(56) References Cited

U.S. PATENT DOCUMENTS

| | | | |
|---|---|---|---|
| 8,116,202 B2* | 2/2012 | Liaw et al. | 370/232 |
| 2009/0296613 A1* | 12/2009 | Kahn et al. | 370/310 |
| 2011/0003609 A1* | 1/2011 | Sundstrom et al. | 455/509 |
| 2011/0051694 A1* | 3/2011 | Cho et al. | 370/335 |
| 2011/0111785 A1* | 5/2011 | Lindoff et al. | 455/513 |
| 2011/0145387 A1* | 6/2011 | Peng et al. | 709/223 |
| 2011/0173332 A1* | 7/2011 | Li et al. | 709/227 |
| 2011/0208853 A1* | 8/2011 | Castro-Castro et al. | 709/223 |

OTHER PUBLICATIONS

ETSI TS 129 213, "Digital Cellular Telecommunications System (Phase 2+); Universal Mobile Telecommunications System (UMTS); LTE; Policy and Charging Control Signalling Flows and Quality of Service (QoS) Parameter Mapping (3GPP TS 29.213 version 9.2.0 Release 9)", 2010.

ETSI TS 129 214, "Universal Mobile Telecommunications System (UMTS); LTE; Policy and Charging Control Over Rx Reference Point (3GPP TS 29.214 version 9.3.0 Release 9)", 2010.

3rd Generation Partnership Project; Technical Specification Group Core Network and Terminals; Policy and Charging Control signalling flows and Quality of Service (QoS) parameter mapping (Release 9), 3GPP Stadard; 3Gpp TS 29.213 3rd Generation Partnership Project (3GPP) Mobile Competence Centre; 650, Route Des Lucioles; F-06921 Sophis-Antipolis Cedex; France No. V9.2.0, Apr. 2, 2010, pp. 1-129.

3rd Generation Partnership Project; Technical Specification Group Services and System Aspects; Policy and charging control architecture (Release 9) 3GPP Standard; 3GPP TS 23.203, 3rd Generation Partnership Project (3GPP) Mobile Competence Centre; 650, Route Des Lucioles; F-06921 Sophia-Antipolis Cedex; France, No. V9.5.0, Jun. 10, 2010 pp. 1-123.

Nokia Siemens Networks et al.: "QoS Authorization for incomplete service information", 3GPP Draft; S2-087805, 3Rd Generation Partnership Project (3GPP), Mobile Competence Centre; 650, Route Des Lucioles, F-06921 Sophis-Antipolis Cedex, France. No. Miami 20081112. Nov 12, 2008, XP050332221.

3rd Generation Partnership Project; Technical Specification Group Core Network and Terminals; Policy and Charging Control over Gx reference point (Release 9), 3GPP Standard; 3GPP TS 29.212, 3rd Generation Partnership Project (3GPP) Mobile Competence Centre; 650, Route Des Lucioles; F-06921 Sophia-Antipolis Cedex; France. No. VP.0.0, Sep. 1, 2009, pp. 1-92, XP050372354.

International Search Report for PCT/IB2011/001782 dated Jan. 6, 2012.

* cited by examiner

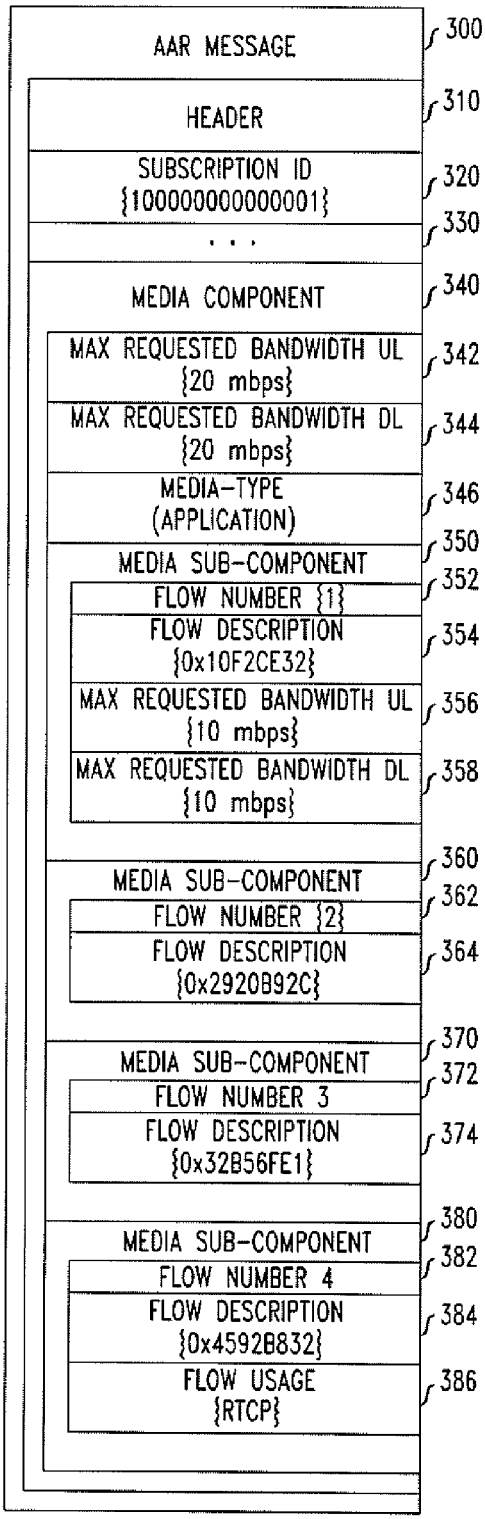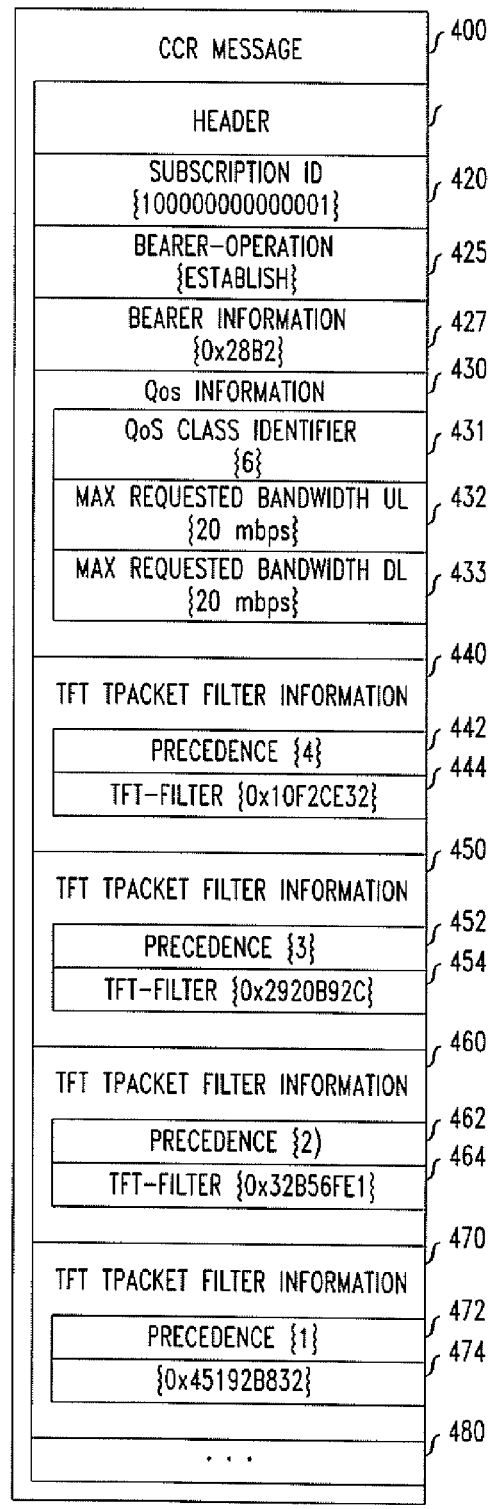

FIG. 5

| RULE NAME (505) | SERVICE DATA FLOW FILTERS (510) | FLOW STATUS (515) | QoS PARAMETERS (520) | CHARGING PARAMETERS (525) | BEARER (530) | SESSION (535) |
|---|---|---|---|---|---|---|
| 0xE426 | 1:0x10F2CE32<br>2:0x2920B92C<br>3:0x32B56FE1<br>4:0x4592B832 | (CLOSED;CLOSED) | {6; 20mbps,20mbps} | {0.05/MB} | {0x28B2} | {0x732A} |
| 0x82A1 | 1:0x10F2CE32 | (OPEN;OPEN) | {6; 10mbps,10mbps} | {0.05/MB} | {0x28B2} | {0x732A} |
| 0x82A2 | 2:0x2920B92C<br>3:0x32B56FE1 | (OPEN;OPEN) | {6; 9mbps, 9mbps} | {0.05/MB} | {0x28B2} | {0x732A} |
| 0X82A3 | 4:0x4592B832 | (OPEN;OPEN) | {6; 1mbps,1mbps} | {0.05/MB} | {0x28B2} | {0x732A} |
| ... | ... | ... | ... | ... | ... | ... |

500

SYSTEM AND METHOD FOR GENERATING AND UPDATING PCC RULES BASED ON SERVICE REQUESTS

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212, 29.213, and 29.214 specifications provide some guidance on generating policy and charging control (PCC) rules. 3GPP TS 29.212 describes the steps taken by a PCRF when it receives requests for PCC rules from the PCEF or requests for QoS rules from the BBERF. 3GPP TS 29.213 describes QoS authorization based on requested QoS for service data flows. 3GPP TS 29.214 describes the steps taken by a PCRF when it receives request for PCC rules from an application function (AF).

The specifications, however, do not describe how to generate PCC rules when the request message does not fully provide QoS information. For example, a request from an AF may not include QoS information for every media sub-component. The specifications provide little detail for generating PCC rules when information is missing. Requests from the PCEF may face the same problem when including multiple packet filters.

In view of the foregoing, it would be desirable to provide a Policy and Charging Rules Node (PCRN) implementing a PCRF capable of generating PCC rules for traffic mappings with incomplete QoS information. In particular, it would be desirable to update PCC rules if QoS information arrives in a later message.

SUMMARY

In light of the present need for PCRN capable of generating PCC rules for traffic mappings with incomplete QoS information, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of generating Policy and Control Charging (PCC) rules for managing packet traffic across a network. The method may include: receiving a request message for PCC rules from a requesting network component; authorizing the first requested bandwidth for the first traffic mapping; authorizing a third bandwidth for at least a second traffic mapping wherein the third authorized bandwidth based on the difference between the second requested bandwidth and the first requested bandwidth; generating a first PCC rule; and generating a second PCC rule. The request message may include: a first traffic mapping describing a flow of packets transmitted across the network, a second traffic mapping describing a second flow of packets transmitted across the network, an indication of a first requested bandwidth applicable to only the first traffic mapping, and an indication of a second requested bandwidth applicable to at least the first traffic mapping and the second traffic mapping. The first PCC rule may include a service flow corresponding to the first traffic mapping and the first authorized bandwidth. The second PCC rule may include a service flow corresponding to the second traffic mapping and the third authorized bandwidth. The method may create PCC rules for request messages including additional traffic mappings and bandwidths. Various exemplary embodiments relate to the above method encoded on a machine-readable storage medium as instructions for a policy and rules charging node to generate PCC rules.

Various exemplary embodiments relate to a policy and charging rules node (PCRN) for generating PCC rules. The PCRN may include: a first interface that receives a request message for PCC rules from a requesting network component, a policy engine that authorizes a first requested bandwidth for a first traffic mapping and authorizes a third bandwidth for at least a second traffic mapping wherein the third bandwidth is based on the difference between a second requested bandwidth and the first requested bandwidth; and a rule generator that generates at least two PCC rules. The request message may include: a first traffic mapping describing a flow of packets transmitted across the network, a second traffic mapping describing a second flow of packets transmitted across the network, an indication of a first requested bandwidth associated with the first traffic mapping, and an indication of a second requested bandwidth associated with at least the first traffic mapping and the second traffic mapping. The first PCC rule may include the first authorized bandwidth and a first flow description corresponding to the first traffic mapping. The second PCC rule may include the third authorized bandwidth and a second flow description corresponding to the second traffic mapping. The PCRN may generate PCC rules based on request messages including additional traffic mappings and bandwidths.

It should be apparent that, in this manner, various exemplary embodiments enable a PCRN capable of generating PCC rules for traffic mappings with incomplete QoS information. In particular, by creating PCC rules with multiple service data flows, the PCRN may allow the traffic mappings to share QoS information included at a higher level of the request message than the traffic mappings. Furthermore, by subtracting the bandwidth allocated to individual flows from the higher level bandwidth, the PCRN may satisfy service requests without allocating extra bandwidth.

BRIEF DESCRIPTION OF THE DRAWINGS

In order to better understand various exemplary embodiments, reference is made to the accompanying drawings, wherein:

FIG. 3 illustrates an exemplary network-originated service request message in the form of an AAR;

FIG. 4 illustrates an exemplary user equipment-originated service request message in the form of a CCR;

FIG. 5 illustrates an exemplary data arrangement for storing PCC rules; and

DETAILED DESCRIPTION

Figure 1:
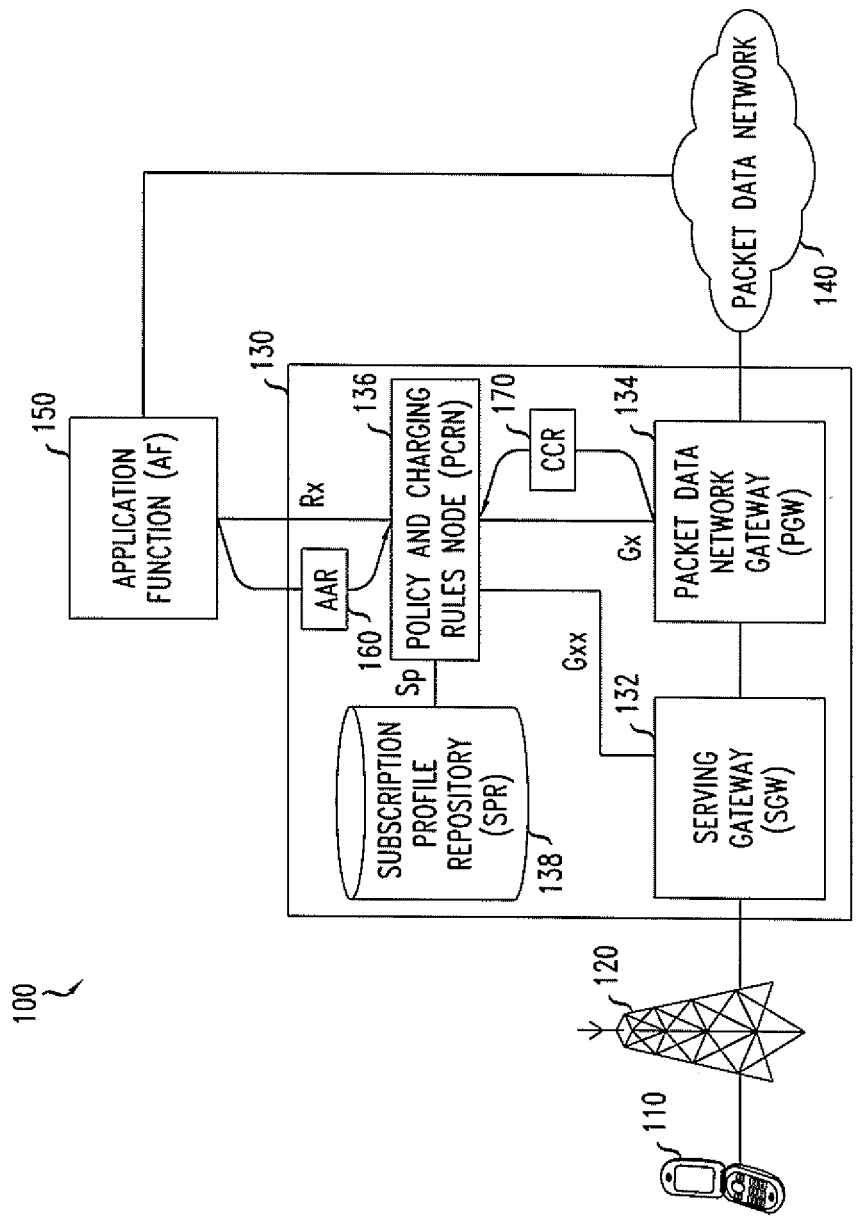
FIG. 1 illustrates an exemplary subscriber network for providing data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include user equipment 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, smart phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136 and a subscriber profile repository (SPR) 138.

Serving gateway (SGW) 132 may be a device that manages data paths between the base station 120 and PGW 134. The data paths may include virtual containers called bearers with unique Quality of Service (QoS) characteristics. The bearers may include virtual connections called service data flows (SDFs). In various embodiments where user equipment 110 is a mobile device and base station 120 is an eNodeB, SGW 132 may be responsible for establishing new bearers when the mobile device changes eNodeB. The SGW 132 may implement a bearer binding and event reporting function (BBERF) according to the 3GPP TS 29.212, 29.213, and 29.214 standards. In various embodiments, EPC 130 may include multiple serving gateways.

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may request new PCC rules from PCRN 136 by sending a CCR message via the Gx interface. PGW 134 may also include a number of additional features such as, for example, packet filtering, deep packet inspection, and subscriber charging support.

Policy and charging rules node (PCRN) 136 may be a device that receives requests for application services, generates PCC rules, and provides PCC rules to the PGW 134 and/or other PCENs (not shown). PCRN 136 may be in communication with AN 150 via an Rx interface. As described in further detail below with respect to AN 150 and FIG. 3, PCRN 136 may receive a service request in the form of an authorization and authentication request (AAR) 160 from AN 150. Upon receipt of AAR 160, PCRN 136 may generate at least one new PCC rule for fulfilling the service request 160.

PCRN 136 may also be in communication with SGW 132 and PGW 134 via a Gxx and a Gx interface, respectively. As described in further detail below with respect to FIG. 4, PCRN 136 may receive a service request in the form of a credit control request (CCR) 170 from SGW 132 or PGW 134. As with AAR 160, upon receipt of CCR 170, PCRN 136 may generate at least one new PCC rule for fulfilling the service request 170. In various embodiments, AAR 160 and CCR 170 may represent two independent service requests to be processed separately, while in other embodiments, AAR 160 and CCR 170 may carry information regarding a single service request and PCRN 136 may create at least one PCC rule based on the combination of AAR 160 and CCR 170. PCRN 136 may also create a first rule based on one message and later update the rule based on a second message. In various embodiments, PCRN 136 may be capable of handling both single-message and paired-message service requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, subscriber priority, and subscriber service preferences.

Packet data network 140 may be any network for providing data communications between user equipment 110 and other devices connected to packet data network 140, such as AN 150. Further, packet data network 140 may provide, for example, phone and/or Internet service to various user devices in communication with packet data network 140.

Application Node (AN) 150 may be a device that provides an application service to user equipment 110. Thus, AN 150 may be a server or other device that provides, for example, streaming video service to user equipment 110. AN 150 may further be in communication with the PCRN 136 of the EPC 130 via an Rx interface. When AN 150 is to begin providing application service to user equipment 110, AN 150 may generate a service request message, such as an AA-Request (AAR) according to the Diameter protocol, to notify the PCRN 136 that resources should be allocated for the application service. Such a service request message may include information such as an identification of the subscriber using the application service and an identification of the particular service data flows (SDF) that must be established within an IP-CAN session in order to provide the requested service. AN 150 may communicate such a service request to the PCRN via the Rx interface 215.

Figure 2:
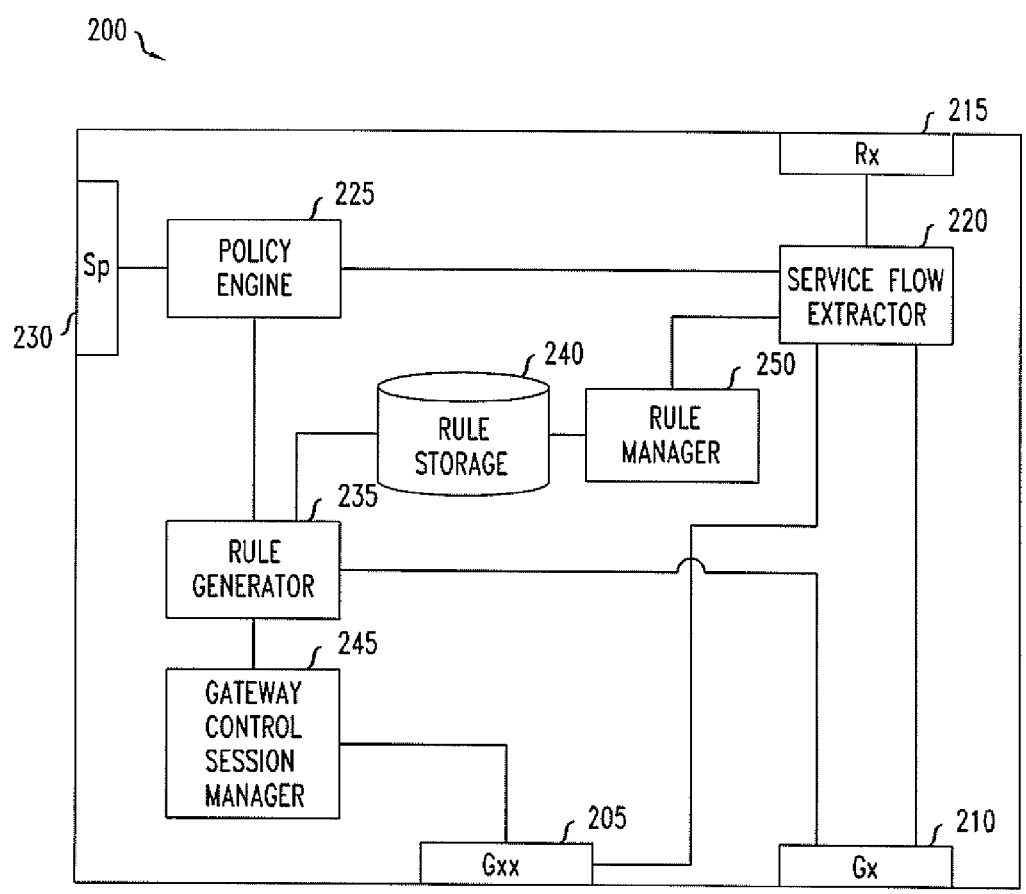
FIG. 2 illustrates an exemplary PCRN for generating PCC rules.

FIG. 2 illustrates an exemplary policy and charging rules node (PCRN) 200 for creating new policy and charging control (PCC) rules in response to service requests. PCRN 200 may correspond to PCRN 136 of exemplary subscriber network 100. PCRN 200 may include Gxx interface 205, Gx interface 210, Rx interface 215, service flow extractor 220, policy engine 225, Sp interface 230, rule generator 235, rules storage 240, gateway control session manager 245 and rules manager 250.

Gxx interface 205 may be an interface comprising hardware and/or executable instructions encoded on a machine-readable storage medium configured to communicate with a SGW such as SGW 132. Such communication may be implemented according to the 3GPP TS 29.212. Thus, Gxx interface 205 may receive requests for QoS rules and transmit QoS rules for installation. Gxx interface 205 may further receive UE-originated service requests in the form of a CCR.

Gx interface 210 may be an interface comprising hardware and/or executable instructions encoded on a machine-readable storage medium configured to communicate with a PGW such as PGW 134. Such communication may be implemented according to the 3GPP TS 29.212. Thus, Gx interface 210 may receive requests for PCC rules and transmit PCC rules for installation. Gx interface 210 may further receive UE-originated service requests in the form of a CCR, such as CCR 170.

Rx interface 215 may be an interface comprising hardware and/or executable instructions encoded on a machine-readable storage medium configured to communicate with an AN such as AN 150. Such communication may be implemented according to the 3GPP TS 29.214. For example, Rx interface 205 may receive a service request (AAR) from AN 150.

Service flow extractor 220 may include hardware and/or executable instructions on a machine-readable storage medium configured to determine from a service request at least one SDF for providing a requested service. As will be described in greater detail below with respect to FIGS. 3-4, a service request may identify a number of streams for providing the requested service. Each stream may be identified by a traffic mapping such as, for example, a flow description or a packet filter. Service flow extractor 220 may then generate an SDF to represent each requested data stream. Each SDF may include information described by the service request such as, for example, requested bandwidth, traffic mapping, subscriber identifier, and/or data stream type. The application request may not indicate a stream bandwidth for each stream. Service flow extractor 220 may assign SDFs representing those data streams a requested bandwidth based on a higher level bandwidth in the service request that applies to the data stream such as, for example, a media component bandwidth or the bandwidth in general QoS information. Service flow extractor 220 may then group SDFs using a higher level bandwidth into groups based on the higher level bandwidth used in the SDF. Streams that include a requested stream bandwidth and are associated with a higher level bandwidth may use the stream bandwidth rather than the higher level bandwidth. SDFs representing such streams may be temporarily grouped by the higher level bandwidth.

It should be apparent that bandwidth may be allocated in both the uplink and downlink directions. The term bandwidth may be used generically to refer to a set of bandwidths in the uplink and downlink directions. When mathematical operations are performed on bandwidth, the operation may be performed separately on the bandwidth in each direction. For example, when subtracting a first bandwidth from a second bandwidth, the first uplink bandwidth may be subtracted from the second uplink bandwidth and the first downlink bandwidth may be subtracted from the second downlink bandwidth.

Policy engine 225 may include hardware and/or executable instructions on a machine-readable storage medium configured to authorize the QoS information of a received service request and/or a SDF object generated by the service flow extractor 220. For ungrouped SDFs, policy engine 225 may authorize the requested stream bandwidth. For grouped SDFs, policy engine 225 may first authorize the requested bandwidth for each SDF using a stream bandwidth. Next, Policy engine 225 may subtract the stream bandwidth from the higher level bandwidth. Then policy engine 225 may remove the SDF using an stream bandwidth from the group. Finally, policy engine 225 may authorize the adjusted higher level bandwidth for the remaining SDFs of the group.

Some SDFs may include a stream bandwidth that requires calculation. Policy engine 225 may calculate a bandwidth for an individual stream based on the flow usage of the stream. For example, if the flow usage indicates that a data flow is a real time transport control protocol (RTCP) flow, policy engine 225 may first attempt to calculate the stream bandwidth based on specially defined values such as RS-Bandwidth and RR-Bandwidth. If the defined values are unavailable, policy engine 225 may calculate the stream bandwidth as 5% of the higher level bandwidth. Policy engine 225 may then subtract the stream bandwidth from the higher level bandwidth.

Policy engine 225 may adjust the authorized QoS information based on subscriber data stored in SPR 138. Policy engine 225 may request subscriber data records from SPR 138 via Sp interface 230. If the requested QoS information exceeds the QoS allowed by the subscriber data record, policy engine 225 may reduce the requested QoS information to comply with the subscriber data record. Policy engine 225 may also deny the service request if the requested QoS information is not allowed by the subscriber data. Policy engine 225 may also limit the requested QoS information based on QoS limits of the requested bearer.

Sp interface 230 may be an interface comprising hardware and/or executable instructions encoded on a machine-readable storage medium configured to communicate with a SPR such as SPR 138. Thus, Sp interface 230 may transmit record requests and receive subscription profile records.

Rule generator 235 may include hardware and/or executable instructions on a machine-readable storage medium configured to generate a new PCC rule based on a received service request, a service flow object generated by the service flow extractor 220, and/or authorized QoS information. Rule generator 235 may first generate a new PCC rule object for each individual SDF and each group of SDFs. Next, rule generator 235 may generate a name for the new PCC rule and store it in the PCC rule object. The PCC rule name may be generated according to any method known to those of skill in the art such as, for example, incrementing a previously assigned rule name or generating a random name. Rule generator 235 may also insert other data into the PCC rule object, including information ascertained from the AAR, CCR, SDFs and/or an existing PCC rule such as, for example, the authorized bandwidth, flow status, and/or flow descriptions. Rule generator 235 may insert more than one flow description into a PCC rule. The flow descriptions may be the flow description of each SDF in a group of SDFs based on a higher level bandwidth. The QoS information, including the bandwidth, for the group may be inserted into the PCC rule. Thus, the PCC rule may have multiple flow descriptions sharing the same QoS information. At this point, the new PCC rule may be a valid rule ready for installation. Rule generator 230 may transmit the rule to PGW 134 via Gx interface 210 for installation. Rule generator 235 may also store the rule in rule storage 240.

Rule storage 240 may be any machine-readable medium capable of storing PCC rules generated by the PCRN 200. Accordingly, rule storage 240 may include a machine-readable storage medium such as read-only memory (ROM), random-access memory (RAM), magnetic disk storage media, optical storage media, flash-memory devices, and/or similar storage media. As will be described in further detail below with respect to FIG. 5, rule storage 240 may store definitions of numerous PCC rules created by PCRN 200. Such definitions may include, for example, rule names, service data flow filters, QoS parameters, and charging parameters.

Gateway control session manager 245 may include hardware and/or executable instructions on a machine-readable storage medium configured to generate and transmit QoS rules for installation at an SGW or other node implementing a gateway control session. In various embodiments utilizing gateway control sessions to provide QoS assurance, such as an embodiment utilizing PMIP, gateway control session manager 245 may extract information necessary to generate a QoS rule from a PCC rule. For example, gateway control session manager 245 may extract the rule name, service data flow filter, and QoS parameters from a PCC rule and generate a new QoS rule. Gateway control session manager 245 may then forward the new QoS rule to an SGW or other appropriate node via Gxx interface 205.

Rules manager 250 may include hardware and/or executable instructions on a machine-readable storage medium configured to select and update PCC rules stored in rules storage 240. When rules manager 250 receives a request including a flow description, rules manager 250 may select a PCC rule by matching the received flow description with a flow description of a PCC rule in rules storage 240. Rules manager 250 may update a PCC rule by removing a flow description from the PCC rule. Rules manager 250 may also adjust the bandwidth of the PCC rule. Alternatively, rules manager 250 may update a PCC rule by deleting the PCC rule and allowing rule generator 235 to generate a replacement rule.

FIG. 3 illustrates an exemplary network-originated service request message in the form of an AAR 300. AAR 300 may be constructed according to the Diameter message protocol and/or 3GPP TS 29.214. Accordingly, AAR 300 may include a header 310, subscription ID field 320, media component field 340, and a number of additional fields 330. Note that the order of the fields of AAR 300 may vary. Thus, for example, subscription ID field 320 may be located after media component field 340.

Header 310 may be a standard Diameter header indicating that message 300 is an AAR. Thus, header 310 may include a command code field set to a value of 265 and the R-bit field of the command flags field set, as provided for by the Diameter protocol and 3GPP TS 29.214.

Subscription ID field 320 may be an attribute-value pair (AVP) for indicating a subscription that is associated with the particular request. For example, subscription ID field 330 indicates that the subscription identified by the value "100000000000001" is associated with AAR 300. This information may be used to access a subscription profile record and charge the appropriate subscriber in relation to the requested service.

Media component field 330 may contain service information related to a media component of a requested service. In the example of AAR 300, the request may be for a streaming video. Media component 330 may, for example, correspond to the video portion of the stream. Media component field 340 may further include a max requested bandwidth (MRB) uplink (UL) field 342, a max requested bandwidth (MRB) downlink (DL) field 344, a media type field 346, and one or more media sub-components such as, for example, media sub-components 350, 360, 370 and 380.

MRB UL field 342 may indicate an amount of bandwidth requested for the media component for use in the uplink direction from UE 110 to AN 150. MRB UL field 342 may apply to any packet traffic for the media component 340. For example, MRB UL field 342 indicates that media component 340 requests 20 mbps for uplink traffic. MRB DL field 344 may indicate an amount of bandwidth requested for the service for use in the downlink direction from AN 150 to UE 110. MRB DL field 344 may apply to any packet traffic for the media component 340. For example, MRB DL field 344 indicates that media component 340 requests 20 mbps for downlink traffic. Media type field 346 may indicate a type of service provided by the media component such as, for example, audio, video, data, application, control, text, message or other service. The contents of media type field 346 may be mapped to a QoS class identifier (QCI).

Media sub components 350, 360, 370, and 380 may each indicate an independent data stream necessary for providing the requested service. Media sub-components may include fields for a flow number, flow description, maximum requested bandwidths, flow usage, and any other field useful for defining a media sub-component. Media sub-components may include fewer fields than listed above.

For example, media sub-component 350 may include flow number field 352, flow description field 354, MRB UL field 356 and MRB DL field 358. Flow number field 352 may include a number used to identify the flow associated with media sub-component 350 within media component 340. Flow number field 352 may include the number 1. Flow description field 354 may include a packet filter used to identify packets associated with the flow of media sub component 350. Flow description field 354 may be considered a traffic mapping. MRB UL field 356 may indicate that the maximum bandwidth used by media sub component 350 in the uplink direction is 10 mbps. MRB DL field 356 may indicate that the maximum bandwidth used by media sub component 350 in the downlink direction is also 10 mbps.

As another example, media sub-component 360 may include flow number field 362 and flow description field 364. Media sub-component 360 may be lacking any fields indicating a requested bandwidth. Flow number field 362 may include a number used to identify the flow associated with media sub-component 360, in this case number "2." Flow description field 364 may include a filter used to identify packets associated with the flow of media sub-component 360. Flow description field 364 may be considered a traffic mapping.

As another example, media sub-component 370 may include flow number field 372 and flow description field 374. Media sub-component 380 may be lacking any fields indicating a requested bandwidth. Flow number field 372 may include a number used to identify the flow associated with media subcomponent 370, in this case number "3." Flow description field 374 may include a filter used to identify packets associated with the flow of media sub component 370. Flow description field 374 may be considered a traffic mapping.

As a final example, media sub-component 380 may include flow number field 382 and flow description field 384. Flow number field 382 may include a number used to identify the flow associated with media sub-component 380, in this case number "4."Flow description field 384 may include a filter used to identify packets associated with the flow of media sub component 370. Flow description field 374 may be considered a traffic mapping. Flow usage field 386 may include an indication of the use of media sub-component 380. Some uses may be associated with bandwidths or rules that can be used to calculate a bandwidth. For example, flow usage field 386 may indicate that media sub-component 380 is a real time transport control protocol (RTCP) flow. As was described with regard to FIG. 2, RTCP flows may use special rules for calculating the bandwidth.

Additional fields 330 may include additional information as specified by the Diameter protocol and/or 3GPP TS 29.214. Thus, additional fields 330 may include additional attribute value pairs (AVPs) such as, for example, the Origin-Host AVP, Destination-Host AVP, Supported-Features AVP, Framed-IP-Address AVP, etc. Additional fields 330 may be used in extracting other useful information such as, for example, flow identifying information.

FIG. 4 illustrates an exemplary user equipment-originated service request message in the form of a CCR 400. CCR 400 may be constructed according to the Diameter message protocol and/or 3GPP TS 29.212. Accordingly, CCR 400 may include a header 410, subscription ID field 420, bearer operation field 425, QoS information field 430, packet filter information fields 440, 450, 460 and 470 and a number of additional fields 480. Note that the order of the fields of CCR 400 may vary. Thus, for example, subscription ID field 420 may be located after QoS information field 430. CCR messages may be used for different types of networks such as, for example, GPRS and EPS/LTE. Although FIG. 4 is shown as a request for a GPRS network, it should be appreciated that EPS/LTE or other networks may make requests using similar information.

Header 410 may be a standard Diameter header indicating that message 400 is a CCR. Thus, header 410 may include a command code field set to a value of 258 and the R-bit field of the command flags field set, as provided for by the Diameter protocol and 3GPP TS 29.212.

Subscription ID field 420 may be an attribute-value pair (AVP) for indicating a subscription that is associated with the particular request. For example, subscription ID field 430 indicates that the subscription identified by the value "100000000000001" is associated with CCR 400. This information may be used to access a subscription profile record and charge the appropriate subscriber in relation to the requested service.

Bearer operation field 425 may indicate whether the service request is requesting a new dedicated bearer. If bearer operation field 425 indicates that the bearer operation is establishment, PCRN 136 may create a dedicated bearer to satisfy the request. In various alternative embodiments such as, for example, a CCR from an LTE network, bearer operation field 425 may be a packet filter operation, in which case an addition operation may indicate a request for a dedicated bearer.

Bearer information 427 may indicate a requested bearer for carrying the traffic such as, for example, a bearer with the identifier "0x28B2." If the bearer information 427 does not match an existing bearer, the request may be for a new dedicated bearer. If the bearer information 427 is not included, the traffic may be assigned to a dedicated bearer, the default bearer, or a bearer selected based on QCI field 431.

QoS information field 430 may contain requested QoS settings for the requested service. QoS information field 430 may apply to every packet information field included in CCR 400. QoS information field 430 may include QoS Class identifier (QCI) field 431, MRB UL field 432, MRB DL field 433, and other fields useful for describing the QoS. QCI field 431 may include an identifier indicating the type of traffic requested. MRB UL 532 may indicate that the maximum bandwidth used by the service in the uplink direction is 20 mbps. MRB DL field 433 may indicate that the maximum bandwidth used by the requested service in the downlink direction is 20 mbps.

Packet filter information fields 440, 450, 460 and 470 may contain service information related to each requested flow for the requested service. In various embodiments, such as those implementing LTE for example, packet filter information fields 440, 450, 460 and 470 may be Packet-Filter-Information AVPs. In various alternative embodiments, such as those implementing GPRS for example, packet filter information fields 440, 450, 460 and 470 may be TFT-Packet-Filter-Information AVPs. Packet filter information fields 440, 450, 460 and 470 may include a precedence field, a filter content field and additional information such as, for example, a type of service, traffic class, and/or flow label. Packet filter information fields may be considered traffic mappings because the filter information can be used to identify a flow of packet traffic. Service flow extractor 220 may derive a flow description from the packet filter information formatting it as a flow description according to 3GPP TS 29.214. Packet filter information fields may not include a bandwidth, so service flow extractor 220 may assign a bandwidth based on a higher level bandwidth such as those contained in QoS information 431.

As an example of packet filter information, packet filter information field 440 describes a TFT packet filter "0x10F2CE32" with a precedence of 4. As another example, packet filter information field 450 describes a TFT packet filter "0x2929B92C" with a precedence of 3. As another example, packet filter information field 460 describes a TFT packet filter "0x32B56FE1" with a precedence of 2. As a final example, packet filter information field 470 describes a TFT packet filter "0x45192B832" with a precedence of 1.

Additional fields 480 may include additional information as specified by the Diameter protocol and/or 3GPP TS 29.212. Thus, additional fields 480 may include additional attribute value pairs (AVPs) such as the CC-Request-Type AVP, Framed-IP-Address AVP, 3GPP-SGSN-Address AVP, etc. Additional fields 480 may be used in extracting other useful information such as, for example, flow identifying information.

FIG. 5 illustrates an exemplary data arrangement for storing PCC rules. Data arrangement 500 may be, for example, a table in a database stored in rules storage 240. Alternatively, data arrangement 500 could be a series of linked lists, an array, or a similar data structure. Thus, it should be apparent that data arrangement 500 is an abstraction of the underlying data; any data structure suitable for storage of this data may be used.

Data arrangement 500 may include data fields such as, for example, rule name field 505, service data flow filters field 510, flow status field 515, QoS parameters field 520, charging parameters field 525, bearer field 530, and session field 535. Data arrangement 500 may include additional fields (not shown) required or useful in defining PCC rules. Data arrangement 500 may include multiple entries for rules such as, for example, rules 540, 545, 550, 555, and 560.

Rule name field 505 may indicate a rule name assigned to the PCC rule. The rule name may be assigned by rule generator 235 at the time the rule is generated. Service data flow filters field 510 may include one or more packet filters describing traffic packets associated with the data flow. The packet filters may be listed in order of their flow number. The presence of a packet filter within flow service data flow filters field 510 may indicate that the PCC rule should apply to any packet that matches the packet filter. Flow status field 515 may indicate whether traffic is allowed to flow for each direction. QoS parameters field 520 may include QoS information for a PCC rule such as, for example, the QCI, MRB UL and MRB DL. QoS parameters field 520 may also include an Allocation Retention Priority (ARP) that indicates the priority of the requested service in case the network must drop traffic or services. Charging parameters 525 may indicate a charging method to be applied to traffic associated with the PCC rule. Bearer field 530 may identify a bearer that may carry traffic associated with the PCC rule. In various embodiments such as, for example, those using GPRS with a UE only bearer control mode, if no bearer is identified, the default bearer may carry the traffic. In various alternative embodiments such as, for example, in the case of LTE, no bearer identifier may be required and each PCC rule may be carried in a dedicated bearer. Session field 535 may indicate the IP-CAN session associated with the PCC rule.

As an example of an entry in data arrangement 500, rule 540 indicates a rule with the rule name "0xE426." Rule 540 may be a PCC rule satisfying the service request of CCR 400. Rule 540 includes four flow descriptions: "0x10F2CE32," "0x2929B92C," "0x32B56FE1," and "0x45192B832." The flow status for each direction is closed, indicating that traffic may not be allowed to flow. The QCI of the traffic is 6. The MRB UL is 20 mbps and the MRB DL is 20 mbps. Because the PCC rule includes only one set of QoS information, the service data flows may share the requested bandwidth. This example PCC rule may be charged at a rate of 5 cents per megabyte of data transfer. The rule indicates that traffic may be carried by bearer "0x28B2," which may have been created as a dedicated bearer when the rule was created. The rule is associated with a session "0x732A," which may be an IP-CAN session.

As another example of an entry in data arrangement 500, rule 545 indicates a rule with the rule name "0x82A1." Rule 545 may be a PCC rule corresponding to media sub-component 350. Rule 545 includes one flow description, "0x10F2CE32." The flow status is open, indicating that traffic may be allowed to flow. The QCI of the traffic is 6. The MRB UL is 10 mbps and the MRB DL is 10 mbps. The traffic associated with the PCC rule is assigned to bearer "0x28B2" and associated with session "0x732A."

As another example of an entry in data arrangement 500, rule 550 indicates a rule with the rule name "0x82A2." Rule 550 may be a PCC rule corresponding to media sub-components 360 and 370. Rule 550 includes two flow descriptions, "0x2929B92C" and "0x32B56FE1." The flow status is open, indicating that traffic may be allowed to flow. The QCI of the traffic is 6. The MRB UL is 9 mbps and the MRB DL is 9 mbps. The traffic associated with the PCC rule is assigned to bearer "0x28B2" and associated with session "0x732A."

As another example of an entry in data arrangement 500, rule 555 indicates a rule with the rule name "0x82A3." Rule 555 may be a PCC rule corresponding to media sub-component 380. Rule 555 includes one flow description, "0x45192B832." The flow status is open, indicating that traffic may be allowed to flow. The QCI of the traffic is 6. The MRB UL is 1 mbps and the MRB DL is 1 mbps. The traffic associated with the PCC rule is assigned to bearer "0x28B2" and associated with session "0x732A."

Figure 6:
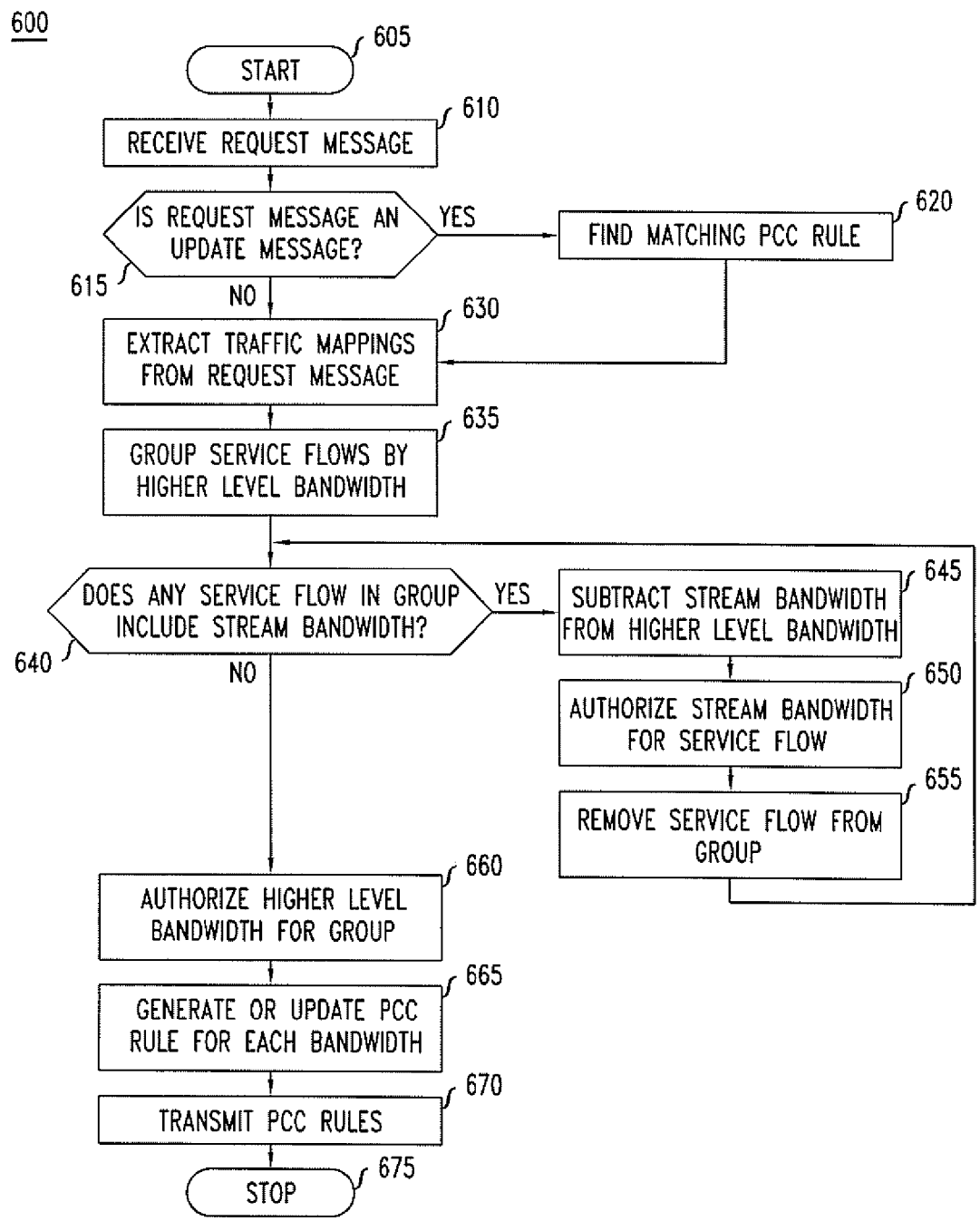
FIG. 6 illustrates an exemplary method for generating a PCC rules for more than one service flow.

FIG. 6 illustrates an exemplary method 600 for generating a PCC rule for more than one service flow in response to a service request. Method 600 may be performed by the components of PCRN 136 and/or PCRN 200 to establish PCC rules for SDFs identified by a service request.

Method 600 may begin at step 605 and proceed to step 610 where PCRN 200 may receive a service request in the form of an AAR via the Rx interface 215 and/or a CCR via the Gxx interface 205 or Gx interface 210. The method may then proceed to step 615, where service flow extractor 220 may determine whether the received message corresponds to another, complementary message, either previously received or expected to be received. If no PCC rule has been created for the complementary message, service flow extractor 220 may generate a full service request according to any manner known to those of skill in the art of processing complementary service requests. For example, service flow extractor 220 may combine the information from both request messages, giving precedence to information from an AAR message if there is a conflict. If a PCC rule has already been created for the complementary message, the complementary message may be considered an update message and method 600 may proceed to step 620. If the received message is not an update message, method 600 may proceed to step 630.

In step 620, service flow extractor 220 may send rules manager 250 one or more flow descriptions corresponding to the traffic mappings of the received message. Rules manager 250 may then search rules storage 240 for PCC rules including flow descriptions that match flow descriptions from the message. If rules storage 240 includes a matching PCC rule, rules manager 250 may return the PCC rule to service flow extractor 220. The PCC rule may provide the same information as a complementary message and be used to update the PCC rule. The method may next proceed to step 630.

In step 630, service flow extractor 220 may extract service flow information from the service request and generate an SDF for each traffic mapping. In the case of an AAR, service flow extractor 210 may extract the media components and media sub-components from the AAR and establish an SDF for each media subcomponent. The SDF for a media subcomponent may include a traffic mapping from a flow description such as flow description AVPs 354 and 364. In the case of a CCR, service flow extractor 220 may establish a service flow object for each packet filter information field such as, for example, packet filter information 440 and 450. Service flow extractor 220 may extract a traffic mapping such as, for example, a TFT-Filter AVP or Filter-Content AVP from the packet filter information field. Service flow extractor 220 may then derive a flow description from the traffic mapping and store the flow description in the SDF. If the service request contains information from both an AAR message and a CCR message or information from a matching PCC rule, service flow extractor 220 may match flow descriptions with packet filters to create a single SDF for each data stream. The method 600 may then proceed to step 635.

In step 635, service flow extractor 220 may group SDFs by higher level bandwidth. For the case of an AAR message, higher level bandwidth may include a bandwidth requested for a media component. Each SDF corresponding to a media sub-component within the media component may be temporarily grouped together. In the case of a CCR message, higher level bandwidth may include bandwidth in a QoS information field such as QoS information field 430 that applies to all packet filter information within the CCR message. Each SDF corresponding to a set of packet filter information within the CCR message may be temporarily grouped together. Service flow extractor 220 may then send the grouped SDFs to policy engine 225. The method 600 may then proceed to step 640.

In step 640, policy engine 225 may determine whether any SDF within a group includes a stream bandwidth. A stream bandwidth may be any indication of a bandwidth requested for a single SDF. For example, a media sub-component such as media sub component 350 may include MRB UL 356 and MRB DL 358. As another example, a media sub-component such as media sub-component 380 may include flow usage field 386 indicating that the SDF is an RTCP flow. Policy engine 225 may calculate the stream bandwidth for an RTCP flow. A stream bandwidth may be included within a packet filter information field of a CCR message. If an SDF within a group includes a stream bandwidth, the method 600 may proceed to step 645. If no SDF within a group includes a stream bandwidth, the method 600 may proceed to step 660.

In step 645, policy engine 225 may subtract the stream bandwidth of an SDF from the higher level bandwidth of the group. For example, policy engine 225 may subtract the bandwidth allocated to a media sub-component from the bandwidth allocated to a media component. The subtraction operation may be performed for both the uplink and downlink bandwidths. If the subtraction operation results in a negative higher level bandwidth, policy engine 225 may determine that there is an error in the service request and deny the request. The method may then proceed to step 650, where policy engine 225 may authorize the stream bandwidth for the SDF. Policy engine 225 may also authorize other QoS information for the SDF at this point. The method may then proceed to step 655, where policy engine 225 may remove the SDF from the group. The method may then return to step 640, where policy engine 225 may determine whether the group includes any remaining SDFs including a stream bandwidth.

In step 660, policy engine 225 may authorize the higher level bandwidth for a group of SDFs. The authorized higher level bandwidth may be lower than originally requested if bandwidth was subtracted in step 645. Policy engine 225 may also authorize other QoS information for the group of SDFs based on information included in the service request. Once policy engine 225 has authorized the QoS information, it may pass the service data flows to rule generator 235, and the method 600 may proceed to step 665.

In step 665, rule generator 235 may generate or update PCC rules based on the SDFs. Rule generator 235 may generate one rule for each group SDFs sharing the same authorized bandwidth and one rule for each individual SDF using a stream bandwidth. If rule generator 235 is updating a PCC rule found in rule storage 240, rule generator 235 may update the found PCC rule using information for a group of SDFs and generate a new rule for each individual SDF. Each rule may include the authorized set of QoS information and service flow information for each SDF. Each set of service flow information may include a service flow filter and a flow number for determining the order of applying the service flow filters. The flow number may be based on a flow number from an AAR message or a precedence value from a CCR message. Rule generator 235 may include the charging parameters determined by policy engine 225 in the PCC rule. If the service request included a bearer identifier, rule generator 235 may include the bearer identifier in the PCC rule. Rule generator 235 may also generate other information for the PCC rule such as, for example, the rule name and flow status. Rule generator 245 may store the PCC rule in rules storage 240. The method may then proceed to step 670, where Gx interface 210 may transmit the PCC rules to PGW 134. PGW 134 may then enforce the PCC rules so that the QoS information is applied to all of the service flow filters within each PCC rule. In this manner, the PCC rules provide the requested service. The method may then proceed to step 675 where it ends.

Figure 7:
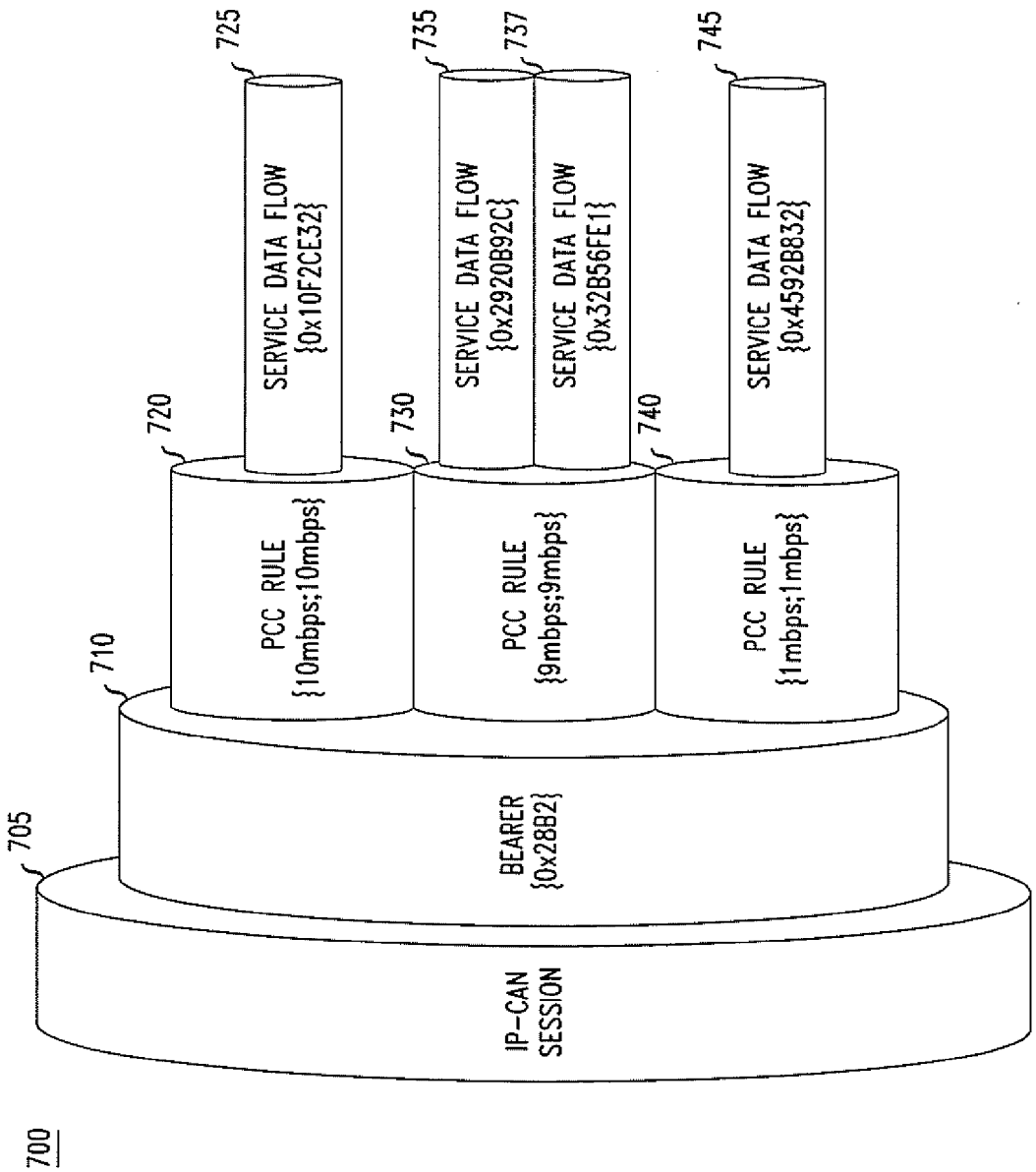
FIG. 7 illustrates an exemplary communication link implementing PCC rules with more than one service data flow.

FIG. 7 illustrates an exemplary communication link 700 implementing PCC rules with more than one SDF. Communication link 700 may include IP-CAN session 705, bearer 710, PCC rules 720, 730 and 750 and service data flows 725, 735, 737 and 745.

IP-CAN session 705 may be a session establishing a communication link between UE 110 and PGW 134. IP-CAN session 705 may assign an IP address to UE 110 to enable communication with packet data network 140. IP-CAN session 705 may include bearers such as bearer 710. IP-CAN session 705 may also include other bearers (not shown) such as a default bearer and other dedicated bearers.

Bearer 710 may be a bearer created in response to AAR 300 to carry the traffic indicated in the request message. Bearer 710 may include the identifier "0x28B2" to uniquely identify the bearer within IP-CAN session 705. Bearer 710 may include PCC rules 720, 730 and 740 to manage QoS.

PCC rule 720 may establish maximum bandwidths of 10 mbps uplink and 10 mbps downlink. PCC rule 720 may also include other QoS information for managing QoS and charging for service. PCC rule 720 may include one or more service data flows such as, for example, service data flow 725. Service data flow 725 may correspond to media sub-component 350 as indicated by the flow description matching the flow description of media sub-component 350. Service data flow 725 is the only service data flow within PCC rule 720, so service data flow 725 may use the full bandwidth of PCC rule 720. The bandwidth may correspond to the bandwidth requested for media sub-component 350.

PCC rule 730 may establish maximum bandwidths of 9 mbps uplink and 9 mbps downlink. PCC rule 730 may include service data flows 735 and 737. These service data flows may correspond to media sub-components 360 and 370, respectively, as indicated by the matching flow descriptions. PCC rule 730 includes two service data flows, so the service data flows 735 and 737 may share the bandwidth of PCC rule 730. The bandwidth may correspond to the bandwidth requested for media component 340 minus the stream bandwidth assigned to the media sub-components within media component 340.

PCC rule 740 may establish maximum bandwidths of 1 mbps uplink and 1 mbps downlink. PCC rule 740 may include service data flow 745. Service data flow 745 may correspond to media sub-component 380 as indicated by the matching flow descriptions. PCC rule 740 includes only one service data flow, so service data flow 745 may use the full bandwidth of PCC rule 740. The bandwidth may correspond to the bandwidth requested for media component 380.

Having described exemplary components and methods for the operation of exemplary subscriber network 100 and PCRN 200, an example of the operation of exemplary network 100 and PCRN 200 will now be provided with reference to FIGS. 1-6. PCRN 136 may correspond to PCRN 200. AAR 300 may correspond to AAR 160. CCR 400 may correspond to CCR 170. Data arrangement 500 may correspond to the contents of rules storage 240.

The process may begin when PCRN 200 receives CCR 400 from SGW 134. CCR 400 may be the first message for the service and may not be considered a complementary message or update message. Service flow extractor 220 may extract four traffic mappings from CCR 400, one for each of packet filter information 440, 450, 460, and 470. Next, service flow extractor 220 may generate an SDF for each of the traffic mappings. Generating the SDFs may require deriving a flow description from the packet filter information. Then service flow extractor 220 may group the SDFs together because the higher level bandwidths of MRB UL 432 and MRB UL 433 apply to each of the traffic mappings.

Policy engine 225 may authorize the bandwidth for the group because none of the packet filter information includes a stream bandwidth. Policy engine 225 may also authorize the other QoS information in QoS information field 431 and determine charging parameters. Rule engine 235 may generate a PCC rule, such as rule 530 for the service request based on the group of SDFs. Rule 530 includes flow information, including the service flow filter, for each of the SDFs extracted from CCR 400. It also includes the authorized QoS information from QoS information field 431.

The process may continue when PCRN 200 receives AAR 300 from AN 150. AAR 300 may be a complementary message requesting the same service as CCR 400. AAR 300 may arrive after PCRN 200 has already created a PCC rule in response to CCR 400, so AAR 300 may also be an update message. Service flow extractor 220 may send the flow descriptions of AAR 300 such as, for example, flow description 354, to rules manager 250. Rules manager 250 may search PCC rules storage 240 using the flow description. Rules manager 250 would find rule 530 because flow description 354 matches one of the service data flow filters of rule 530. Rules manager 250 may pass rule 530 to service flow extractor, so that it may be updated. Service flow extractor 220 may continue generating the new PCC rules by extracting the traffic mappings from each media sub-component of AAR 300. Service flow extractor 220 may also match the traffic mappings with the SDF filters of matching rule 530. Next, service flow extractor 220 may generate SDFs for each traffic mapping and group them together based on the higher level bandwidth found in MRB UL 342 and MRB DL 344. The SDFs for media sub-component 350 and media-component 380 may include a stream bandwidth, but may be temporarily grouped with media sub-components 360 and 370.

Policy engine 225 may first determine that the SDF for media sub-component 350 includes a stream bandwidth because media sub-component 350 includes MRB UL 356 and MRB DL 358. Next, policy engine 225 may subtract the bandwidth for media sub-component 350 from the higher level bandwidth for the group of SDFs. The subtraction operation would leave 10 mbps uplink and 10 mbps downlink for the group of SDFs. Policy engine 225 may then authorize the bandwidth in MRB UL 356 and MRB DL 358 for media sub-component 350. Then policy engine 225 may remove the SDF for media sub-component 350 from the group.

Policy engine 225 may next determine that the SDF for media sub-component 380 includes a stream bandwidth because media sub-component 380 is an RTCP flow as indicated by flow usage field 386. Policy engine 225 may calculate the stream bandwidth for media sub-component 380 as five percent of the bandwidth requested for the media component. Therefore, media sub-component 380 may have a stream bandwidth of 1 mbps uplink and 1 mbps downlink. Next, policy engine 225 may then subtract this bandwidth from the higher level bandwidth for the group of SDFs leaving a bandwidth of 9 mbps uplink and 9 mbps downlink. Then policy engine 225 may authorize the bandwidth of 1 mbps uplink and 1 mbps downlink for media sub-component 380. Policy engine 225 may then remove the SDF for media sub-component 380 from the group of SDFs.

Policy engine 225 may then determine that the group of SDFs does not include an SDF with a stream bandwidth. Policy engine 225 may then authorize the higher level bandwidth of 9 mbps uplink and 9 mbps downlink for the group of SDFs. Policy engine 225 may then pass the SDFs to rule generator 235. Rule generator 235 may generate a PCC rule for each SDF including a stream bandwidth and for each group of SDFs. Rule generator 235 may first generate rule 535 for the SDF corresponding to media sub-component 350. Next, rule generator 235 may generate rule 540 for the group of SDFs corresponding to media sub-components 360 and 370. This rule may be an update for rule 530. Finally, rule generator 235 may generate rule 545 for the SDF corresponding to media sub-component 380. The details of these rules have been described above with respect to FIG. 7. The PCC rules may be transmitted via Gx interface 210 to PGW 134, where they may be used to provide the requested service. The PCC rules may also be stored in rules storage 240. Gateway control session manager 245 may generate QoS rules from the PCC rules by extracting the QoS related portions from data arrangement 500 and transmitting the QoS rules to SGW 132 via Gxx interface 205.

According to the foregoing, various exemplary embodiments provide for a PCRN capable of generating PCC rules for traffic mappings with incomplete QoS information. In particular, by creating PCC rules with multiple service data flows, the PCRN may allow the traffic mappings to share QoS information included at a higher level of the request message than the traffic mappings. Furthermore, by subtracting the bandwidth allocated to individual flows from the higher level bandwidth, the PCRN may satisfy service requests without allocating extra bandwidth.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of generating Policy and Control Charging (PCC) rules for managing packet traffic across a network, the method comprising:
   receiving a request message for PCC rules from a requesting network component, the message comprising:
      a first traffic mapping describing a flow of packets transmitted across the network,
      a second traffic mapping describing a second flow of packets transmitted across the network,
      an indication of a first requested bandwidth associated with the first traffic mapping, and
      an indication of a second requested bandwidth associated with at least the first traffic mapping and the second traffic mapping;
   authorizing the first requested bandwidth for the first traffic mapping;
   authorizing a third bandwidth for at least the second traffic mapping wherein the third authorized bandwidth is based on the difference between the second requested bandwidth and the first requested bandwidth;
   generating a first PCC rule comprising: a service flow filter corresponding to the first traffic mapping and the first authorized bandwidth; and
   generating a second PCC rule comprising: a service flow filter corresponding to the second traffic mapping and the third authorized bandwidth,
   wherein the first traffic mapping is one of a flow description field and a packet filter information field and the second traffic mapping is one of a flow description field and a packet filter information field, and wherein both traffic mappings are either the flow description fields or the packet filter information fields concurrently.

2. The method of claim 1, wherein the request message is an Authorization and Authentication Request (AAR) message, the first requested bandwidth comprises a maximum uplink bandwidth and a maximum downlink bandwidth for a media sub-component, and the second requested bandwidth comprises a maximum uplink bandwidth and a maximum downlink bandwidth for a media component.

3. The method of claim 1, wherein the indication of the first requested bandwidth comprises an indication that the first traffic mapping is for a Real Time Transport Control Protocol (RTCP) flow, the method further comprising calculating the first requested bandwidth according to a rule for RTCP flows.

4. The method of claim 3 wherein the step of calculating comprises:
   calculating the first requested bandwidth as five percent of the second requested bandwidth.

5. The method of claim 1 wherein the request message comprises more than one requested bandwidth associated with only one traffic mapping and the third authorized bandwidth equals the second requested bandwidth minus the sum of the bandwidths associated with only one traffic mapping.

6. The method of claim 1 wherein the request message is a complementary message, the method further comprising:
   extracting a first flow description from the first traffic mapping;
   matching the first flow description with a flow description of an existing PCC rule; and
   deleting the matching PCC rule.

7. The method of claim 6 wherein the step of generating a first PCC rule and the step of generating a second PCC rule comprise generating the PCC rule based on the complementary message and the matching PCC rule.

8. A Policy and Charging Rules Node (PCRN) for generating Policy and Control Charging (PCC) rules, the PCRN comprising:
   a first interface that receives a request message for PCC rules from a requesting network component, the message comprising:
      a first traffic mapping describing a flow of packets transmitted across the network,
      a second traffic mapping describing a second flow of packets transmitted across the network,
      an indication of a first requested bandwidth associated with the first traffic mapping, and
      an indication of a second requested bandwidth associated with at least the first traffic mapping and the second traffic mapping;
   a policy engine that authorizes the first requested bandwidth for the first traffic mapping and authorizes a third bandwidth for at least the second traffic mapping wherein the third bandwidth is based on the difference between the second requested bandwidth and the first requested bandwidth;
   a rule generator that generates at least two PCC rules, the first PCC rule comprising: the first authorized bandwidth and a first service flow filter corresponding to the first traffic mapping, and the second PCC rule comprising: the third authorized bandwidth and a second service flow filter corresponding to the second traffic mapping,
   wherein the first traffic mapping is one of a flow description field and a packet filter information field and the second traffic mapping is one of a flow description field and a packet filter information field, and wherein both traffic mappings are either the flow description fields or the packet filter information fields concurrently.

9. The PCRN of claim 8 further comprising:
   a service flow extractor that extracts the traffic mappings and the indications of bandwidth from a request message and generates service data flows corresponding to the traffic mappings.

10. The PCRN of claim 9 wherein the service flow extractor places service data flows into groups, each group comprising service data flows associated with a higher level bandwidth.

11. The PCRN of claim 8 further comprising:
a rules storage that stores PCC rules generated by the rules generator; and
a rule manager that matches a service flow extracted from a complementary message with a service flow of a PCC rule in the rules storage and deletes the matching PCC rule from the rules storage,
wherein the rule generator generates the at least two PCC rules based on information from the matching PCC rule and information from the complementary message.

12. The PCRN of claim 8 wherein the indication of the first requested bandwidth comprises an indication that the first traffic mapping is for a Real Time Transport Control Protocol (RTCP) flow,
wherein the policy engine calculates the first requested bandwidth as five percent of the second requested bandwidth.

13. The PCRN of claim 8 further comprising:
a gateway control session manager that extracts at least the second flow description and the third bandwidth from the second PCC rule and generates a quality of service (QoS) rule;
a Gxx interface that transmits the QoS rule to a serving gateway.

14. A non-transitory machine-readable storage medium encoded with instructions for a policy and rules charging node (PCRN) to generate Policy and Control Charging (PCC) rules, the non-transitory machine-readable storage medium comprising:
instructions for receiving a request message for PCC rules from a requesting network component, the message comprising:
a first traffic mapping describing a flow of packets transmitted across the network,
a second traffic mapping describing a second flow of packets transmitted across the network,
an indication of a first requested bandwidth applicable to only the first traffic mapping, and
an indication of a second requested bandwidth applicable to at least the first traffic mapping and the second traffic mapping;
instructions for authorizing the first requested bandwidth for the first traffic mapping;
instructions for authorizing a third bandwidth for at least the second traffic mapping wherein the third authorized bandwidth is based on the difference between the second requested bandwidth and the first requested bandwidth;
instructions for generating a first PCC rule comprising: a service flow filter corresponding to the first traffic mapping and the first authorized bandwidth; and instructions for generating a second PCC rule comprising:
a service flow filter corresponding to the second traffic mapping and the third authorized bandwidth,
wherein the first traffic mapping is one of a flow description field and a packet filter information field and the second traffic mapping is one of a flow description field and a packet filter information field, and wherein both traffic mappings are either the flow description fields or the packet filter information fields concurrently.

15. The non-transitory machine-readable storage medium of claim 14, wherein the request message is an Authorization and Authentication Request (AAR) message, the first requested bandwidth comprises a maximum uplink bandwidth and a maximum downlink bandwidth for a media subcomponent, and the second requested bandwidth comprises a maximum uplink bandwidth and a maximum downlink bandwidth for a media component.

16. The non-transitory machine-readable storage medium of claim 14, wherein the indication of the first requested bandwidth comprises an indication that the first traffic mapping is for a Real Time Transport Control Protocol (RTCP) flow, the machine-readable storage medium further comprising instructions for calculating the first requested bandwidth according to a rule for RTCP flows.

17. The non-transitory machine-readable storage medium of claim 16 wherein instructions for calculating comprise:
instructions for calculating the first requested bandwidth as five percent of the second requested bandwidth.

18. The non-transitory machine-readable storage medium of claim 14 wherein the request message comprises more than one requested bandwidth associated with only one traffic mapping and the second authorized bandwidth equals the second requested bandwidth minus the sum of the bandwidths associated with only one traffic mapping.

19. The non-transitory machine-readable storage medium of claim 14 wherein the request message is a complementary Authorization and Authentication Request (AAR) message, the non-transitory machine-readable storage medium further comprising:
instructions for extracting a first flow description from the first traffic mapping;
instructions for matching the first flow description with a flow description of an existing PCC rule; and
instructions for updating the matching PCC rule.

20. The non-transitory machine-readable storage medium of claim 19 wherein the instructions for generating the first PCC rule and the instructions for generating the second PCC rule comprise instructions for generating the PCC rule based on information in the complementary message and information in the matching PCC rule. Δ

* * * * *